United States Patent
Spaulding et al.

[19]

[11] Patent Number: 6,054,517
[45] Date of Patent: *Apr. 25, 2000

[54] CLEAR COMPOSITIONS FOR USE IN SOLID TRANSPARENT CANDLES

[75] Inventors: Laura A. Spaulding, Wayne; Robert V. Burke, Closter, both of N.J.

[73] Assignee: Noville Corporation, South Hackensack, N.J.

[ * ] Notice: This patent is subject to a terminal disclaimer.

[21] Appl. No.: 09/113,544

[22] Filed: Jul. 10, 1998

[51] Int. Cl.$^7$ ........................................ C08J 3/00
[52] U.S. Cl. ............................ 524/275; 44/275; 524/606
[58] Field of Search ............................... 44/275; 524/275, 524/606

[56] References Cited

U.S. PATENT DOCUMENTS

| | | | |
|---|---|---|---|
| 3,148,125 | 9/1964 | Sabbat et al. | 167/85 |
| 3,341,465 | 9/1967 | Kaufman et al. | 252/316 |
| 3,615,289 | 10/1971 | Felton | 44/7.5 |
| 3,645,705 | 2/1972 | Miller et al. | 44/7.5 |
| 3,819,342 | 6/1974 | Gunderman et al. | 44/7.5 |
| 4,275,054 | 6/1981 | Sebag et al. | 424/65 |
| 5,500,209 | 3/1996 | Ross et al. | 424/66 |
| 5,512,648 | 4/1996 | Sparrow et al. | 526/307.3 |
| 5,578,089 | 11/1996 | Elsamaloty | 44/275 |
| 5,603,925 | 2/1997 | Ross et al. | 424/65 |
| 5,653,970 | 8/1997 | Vermeer | 424/70.25 |
| 5,843,194 | 12/1998 | Spaulding | 44/275 |
| 5,882,363 | 3/1999 | Spaulding et al. | 44/275 |

FOREIGN PATENT DOCUMENTS

| | | | |
|---|---|---|---|
| WO 97/08282 | 3/1997 | WIPO | C11C 5/00 |
| WO 97/36573 | 10/1997 | WIPO | A61K 7/48 |

*Primary Examiner*—David W. Wu
*Assistant Examiner*—Ling Sui Choi
*Attorney, Agent, or Firm*—Kenyon & Kenyon

[57] ABSTRACT

The present invention relates to clear solid compositions that may be used as the base material of a transparent candle, to the transparent candles made therefrom, and to methods of making the same. The compositions of the present invention include one or more polyamide resins present in a total amount of about 60–80% by weight of the composition, one or more solubilizers, and one or more emulsifiers.

24 Claims, No Drawings

CLEAR COMPOSITIONS FOR USE IN SOLID TRANSPARENT CANDLES

FIELD OF INVENTION

The present invention relates to clear solid compositions that are useful as the base material of a transparent candle, to the transparent candles made therefrom, and to methods of making the same.

BACKGROUND OF THE INVENTION

While the burning of a candle might appear to be simple and uninvolved, the process that takes place in the burning of a candle has been described, in fact, as a process that imposes rather stringent requirements upon the candle body material, U.S. Pat. Nos. 5,578,089, 3,819,342, 3,645,705 and 3,615,289. This is illustrated, in particular, with respect to the actual burning of the candle when the heat of the candle's flame melts a small pool of the candle body material around the base of the exposed portion of the wick. This molten material is then drawn up through and along the wick by capillary action to fuel the flame. A candle's melting point is, therefore, important in that the candle material should liquefy at or below temperatures to which the candle's material can be raised by radiant heat from the candle flame. If the candle's melting temperature is too low, the candle will drip or, in an extreme case, the entire candle body will melt, dropping the wick into a pool of molten body material, with the potential that the surface of the pool could ignite. If too high a temperature is required to melt the body material, the flame will be starved because insufficient fuel will be drawn up through the wick, with the result that the flame will be too small to maintain itself. Moreover, when molten, the candle body material preferably has a relatively low viscosity to insure that it will be capable of being drawn up through the wick by capillary action. In addition to meeting the above requirements, it is preferred that the candle body material burn with a flame that is both luminous and smokeless, and that the odors produced by its combustion should not be unpleasant or intrusive.

The desire to make candles that are transparent or clear places still further demands on these already stringent requirements. The terms "clear" and "transparent" are used interchangeably herein and connote a substantial absence of cloudiness or obscurity, so that the body of the candle features an ability to let light pass through in a substantially unobstructed manner, and an ability to have coloring agent added to the composition without causing cloudiness or reducing the candle's ability to let light pass through in a relatively unobstructed manner. Preferably, the composition has a degree of clarity comparable to window glass, clear glassware, or water.

To add yet one more demand on transparent candle compositions, it would also be desirable if the transparent candles could be used as a fragrance carrier for dispersing selected fragrances, such as fragrances having a pleasant odor, or fragrances that repel insects.

Moreover, it is desirable to accelerate the cooling of candles during manufacture, for example by passing the candles through a cooling tunnel, to reduce the manufacturing time. Also, a mold release, such as a silicone based formulation, is typically used to facilitate the release of a candle from a mold during manufacture.

Transparent compositions used to make transparent candles typically have one or more undesirable characteristics. In particular, such compositions typically do not have enough rigidity to form a self-supporting candle, and require some type of container or external support. Such compositions also typically lack hardness, which may lead to an undesirable gelatinous feeling. In addition, such compositions may darken or smoke during burning, which is aesthetically undesirable. Candles made from transparent compositions may also exhibit external cracking and/or internal fractures if they are passed through a cooling tunnel during manufacture, and may also crack during burning. Also, mold release formulations generally leaves a residue that may dull the clarity of a transparent candle.

Known transparent candle compositions which are comprised of a thermoplastic polyamide resin and a flammable solvent for solubilizing the resin, such as described in U.S. Pat. Nos. 3,615,289 and 3,819,342 are vulnerable to auto-ignition, and tend to sweat, produce black smoke, and darken during burning. Sweating is the process whereby oils migrate out of the candle body to the surface, giving it an oily texture, and is most commonly caused by syneresis. Syneresis occurs whenever oil is physically squeezed out from the candle body because of excessive chemical cross linking. Sweating is not only an aesthetic drawback, but can be a performance or safety problem as well. If a candle sweats, the oil on the surface is available to ignite, which can result in an uncontrolled or torch-like situation rather than a candle.

U.S. Pat. No. 5,578,089 describes a heterophase thermally reversible mineral oil gel formed by a system of physically crosslinked block copolymers which purportedly overcome the problem of sweating and syneresis by adjusting the ratio of diblock and triblock polymers so as to ensure that all the oil remains entrained within a system of physically crosslinked copolymers. The thermoplastic rubber type polymers of U.S. Pat. No. 5,578,089 consist of block segments of styrene monomer units and rubber monomer units, wherein each block segment may consist of 100 monomer units or more (col. 7, lines 4–20). While such compositions are alleged to provide an improvement over the prior art transparent candle compositions, styrene/rubber-based candle compositions are susceptible to surface ignition, which may produce black smoke, and also have limited fragrance throw.

It would be desirable to have transparent and odorless compositions that could be used to prepare self-supporting transparent candles that do not have a gelatinous feeling. It would also be desirable to have compositions that can be used to make self-supporting transparent candles that have an aesthetically attractive appearance and that can burn safely and cleanly, without cracking or fracturing. It would also be desirable if fragrances could be readily dissolved in the composition without causing cloudiness or hazing. It would be desirable to have compositions that can be cooled during manufacture from a liquid state to room temperature in a cooling tunnel, without cracking or fracturing. In addition, it would be desirable to have compositions that shrink during cooling to the point that the transparent candle can be removed from the mold without the use of a mold release.

The present invention is directed toward self-supporting transparent candle compositions that provide these advantages while not being handicapped with the above-noted disadvantages.

SUMMARY OF THE INVENTION

The present invention is directed to clear solid compositions that are useful as the base material for transparent candle compositions that burn safely and cleanly and which may be used for dispensing fragrances.

More specifically, a first embodiment of the present invention relates to a composition for use in a clear solid candle, comprising: one or more gellants, and one or more 12-hydroxystearic acid ester solvents, where a 12-hydroxystearic acid ester solvent has the following chemical structure:

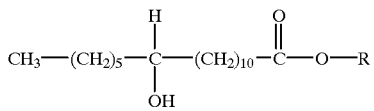

and where R may by selected from the group consisting of alkyl radicals, aryl radicals, and arylalkyl radicals.

An example of the first embodiment is a clear composition for use in a clear solid candle, that contains octylhydroxystearate, a 12-hydroxystearic acid ester solvent, in an amount of about 10% to about 70%, wherein octylhydroxystearate has the following chemical structure:

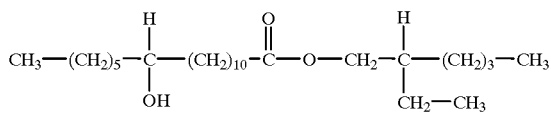

A second embodiment of the present invention is a clear composition for use in a solid candle, that contains one or more polyamide resins, in an amount of about 60–80% by weight of the composition, one or more solubilizers, and one or more emulsifiers.

Preferably, a composition of the present invention has a high degree of clarity, with little or no haze or cloudiness, and more preferably the composition is crystal clear, even when fragrances or coloring agents have been added. Preferably, the composition does not darken or smoke when a candle made of the composition is burning. Preferably, candles made of the composition do not crack or split during burning, nor suffer from syneresis. Preferably, candles made of the composition have a wide pool, which provides greater fragrance throw and helps avoid tunneling. Preferably, the composition is rigid enough to form a self-supporting candle, and avoids an undesirable gelatinous feel. Preferably, the composition is thermoreversible, such that the pool solidifies after the candle is extinguished, without significant change to the properties of the composition. Preferably, a candle made of the composition retains structural integrity while burning, and the sides of the candle do not bulge out. Preferably, the composition does not superheat, and the surface of candles made of the composition remains cool to the touch while the candle is burning. Preferably, candles made of the composition have a burn rate of about 3–4 grams per minute.

The present invention is also directed to combinations of additional components that can be included in the composition to produce candles having enhanced or additional aesthetic and functional improvements. In particular, the additional materials that may be included in the transparent candle compositions include solvents, coupling agents, solubilizers, clarifiers, emulsifiers, and plasticizers. Also, a clear coating material may optionally be applied to the candle to enhance hardness and mar resistance.

The present invention is also directed toward transparent candles made from the clear solid compositions disclosed herein, and methods of making such candles.

The transparent candles of the present invention are, in particular, characterized by being formed of a clear solid composition that is capable of burning with a smoke-free flame, and does not darken while the candle is burning. Moreover, the transparent candles formed of the clear solid composition are self-supporting, and do not require a container or external support, unlike clear gel candles. The transparent candles of the present invention also have other desirable aesthetic features, such as a waxy feel.

Further objectives and advantages of the subject invention will be apparent to those skilled in the art from the detailed description of the disclosed invention.

DETAILED DESCRIPTION

The subject invention will now be described in detail for specific preferred embodiments of the invention, it being understood that these embodiments are intended only as illustrative examples and the invention is not to be limited thereto.

As used herein, "composition" refers to a base material from which solid transparent candles can be made.

A first embodiment of the present invention has a composition that includes a gellant and a solvent, mixed together. The gellant should be soluble in the solvent at elevated temperatures, and at room temperature after cooling. The composition should be liquid at elevated temperatures but solid at room temperature. The gellant provides structure to the candle, although the quality of that structure may be affected by many factors, such as the type and amount of solvent used, and the type and amount of other additives. The solvent binds to the gellant, and has a large effect on the burning characteristics of the candles, such as whether the candle smokes while burning, whether the pool darkens during burning, and the heat of the flame. Other factors, such as the type and size of the wick, and other components included in the base material, can also contribute to the burning characteristics.

The composition of the first embodiment includes one or more gellants, preferably totaling about 40–70% by weight of the composition, and more preferably about 50–60% by weight. Candles having the preferred range of gellants are more likely to have a larger pool size, and less likely to have internal or external cracking, or syneresis, although these problems can be addressed by the addition of other components rather than by adjusting the amount of gellant. Two classes of polyamides are typically soluble in solvents of interest, and are preferred gellants for the present invention: (1) polyamides based on terpolymers of simple nylons (such as DuPont ELVAMIDE® 8061, which is a terpolymer of nylon 6, nylon 66, and nylon 610); and (2) polyamides based on complex fatty acids, such as the VERSAMID® series of Henkel Corp. or the UNIREZ® series of Union Camp Corp. U.S. Pat. No. 5,500,209, which is incorporated herein by reference, provides a more detailed description of these polyamides. Preferably, the gellant is selected from the group consisting of polyamide resins and derivatives thereof. More preferably, the gellant is the polyamide resin VERSAMID® 1655, available from the Henkel Corporation located in Ambler, Pa. VERSAMID® 1655 is a thermoplastic polyamide resin based on vegetable acid and aliphatic polyamines.

The composition of the first embodiment also includes one or more solvents, preferably totaling about 10–70% by weight of the composition, more preferably about 20–70% by weight, and more preferably about 35–45% by weight. Solvents suitable for use in the present invention include esters of 12-hydroxystearic acid with a monohydric or polyhydric alcohol, i.e., octylhydroxystearate and derivatives thereof. This class of solvents is referred to herein as "12-hydroxystearic acid esters," and has a chemical structure represented by the formula:

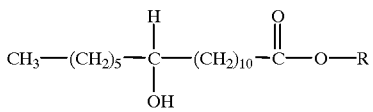

where R is selected from the group consisting of alkyl radicals, aryl radicals, and arylalkyl radicals. Preferably, R is selected from the group consisting of:

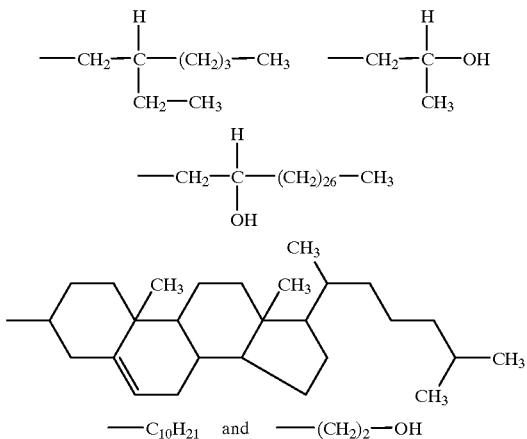

More preferably, the solvent is octylhydroxystearate, which has a chemical structure represented by the formula:

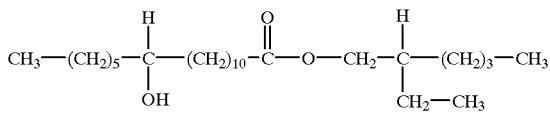

Octylhydroxystearate is available commercially as WICK-ENOL® 171 from Alzo, Inc., located in Matawan, N.J., or as CRODAMOL® OHS from Croda, Inc., located in Parsippany, N.J.

The solvent is a "reactive" solvent in the sense that the gellant binds with hydroxy group(s) on the solvent when the two components are mixed. For example, the VERSAMID® 1655 polyamide resin binds to the hydroxy group on the octylhydroxystearate when the two are mixed.

To Clear candles may be made from a composition of the first embodiment using VERSAMID® 1655 as the gellant and octylhydroxystearate as the solvent, along with other components as described below. It has been demonstrated that such a composition allows for the manufacture of a solid clear candle having several advantages. Such candles are hard to the touch and capable of self-support, and do not require a container. Also, such a candle does not significantly darken or smoke during burning.

Such a clear candle also has a desirable burn rate of 3–4 grams per hour, similar to a wax candle, and in contrast to styrene/rubber clear candles, which have a significantly slower burn rate on the order of 2 grams per hour. While not intending to be limited by any theory of how the present invention works, it is believed that the three oxygen atoms present in a single molecule of octylhydroxystearate lead to good oxygenation of the flame for a hotter burn and a faster burn rate.

The inventors analysis shows that the other solvents disclosed as suitable for use in the first embodiment, i.e., 12-hydroxystearic acid esters other than octylhydroxystearate, would have properties similar to those exhibited by octylhydroxystearate.

As used herein, "additional solvents" refers to solvents suitable for use in a candle, other than 12-hydroxystearic acid esters. Additional solvents include castor oil, oleic acid, or other conventional solvents known to the art, such as solvents disclosed in U.S. Pat. No. 3,819,342, which is incorporated herein by reference. These additional solvents may be used in conjunction with the solvents of the present invention. If the amount of additional solvent is kept low, the resultant composition would most likely have many of the desirable characteristics of the present invention. However, as the amount of these known solvents is increased, it is likely that undesirable properties of these known solvents would become manifest, such as darkening during burning. It is therefore preferable that substantially all of the solvents are selected from the group consisting of 12-hydroxystearic acid esters.

While a candle made of a composition having only a gellant and a solvent would be functional, such a candle is likely to suffer from several problems. For example, such a candle may exhibit "tunneling," i.e., a narrow tunnel through the body of the candle is formed as the candle burns. For example, tunneling may occur when the pool is significantly smaller than the candle diameter. The clarity of such a candle may be decreased by the addition of a fragrance or coloring agent, due to poor solubility of the fragrance or coloring agent in the solvent/gel composition. Other potential problems include syneresis, cracking and splitting due to thermal differentials when the candle is burning, and haziness. For example, compositions containing only VERSAMID® 1655 and octylhydroxystearate were shown to make functional candles that were just slightly hazy. Other components can be added to the composition to address these problems.

One or more solubilizers may be added to the composition of the first embodiment in a total amount of about 0–15% by weight, and preferably in an amount of about 7–12% by weight. Solubilizers improve the solubility of the gellant in the solvent, and thereby improve the clarity of the gellant/solvent blend. Solubilizers may also provide some of the functionality of a plasticizer. Solubilizers suitable for use with the present invention include isostearic acid, and branched chain fatty alcohols, such as isostearyl alcohol. Preferably, isostearyl alcohol is used as a solubilizer, because it is compatible with many other components that might be added to the composition. Solubilizers may also function as a coupling agent, which couple other components into the solution.

One or more emulsifiers may be added to the composition of the first embodiment in a total amount of about 0–7% by weight, preferably about 0–5% by weight, and more preferably in an amount of about 1–2% by weight. Emulsifiers improve the solubility of multi-component fragrance oils in the composition of the present invention, thereby improving clarity when fragrance molecules are present. Emulsifiers may also lower the surface tension of molten gellant, enhancing the ability of the gellant to move into a wick by capillary action, and to flow up the wick to vaporize and burn. Preferably, a nonionic emulsifier is used, because nonionic emulsifiers have good compatibility with compositions of the present invention. Preferably, the emulsifier is non-ethoxylated, i.e., does not have any ethoxyl groups, to avoid hazing. Preferably, the emulsifier is a sorbitan derivative. More preferably, the emulsifier is selected from the group consisting of sorbitan laureate, sorbitan palmitate, sorbitan stearate, sorbitan tristearate, sorbitan oleate, sorbitan trioleate, sorbitan sesquioleate. These sorbitan derivatives are commercially available from ICI Americas, and are sold under the trademarks SPAN® and ARLACEL®, with various alphanumeric designations for the different derivatives. More preferably, the emulsifier is selected from the group consisting of sorbitan laureate and sorbitan oleate. Most preferably, the emulsifier is sorbitan laureate.

One or more plasticizers may be added to the composition of the first embodiment in a total amount of about 0–10% by weight, preferably in an amount of about 0–5% by weight, and more preferably in an amount of about 1–2% by weight. Plasticizers increase the structural flexibility of compositions of the present invention, thereby allowing the compositions to deform slightly instead of cracking or splitting when subjected to the thermal stresses associated with burning a candle. Depending on the amounts of the other components, and in particular the amount of gellant, a plasticizer may not be needed to prevent cracking and splitting. Plasticizers suitable for use with the present invention include stearic acid; isopropyl palmitate; isopropyl myristate; linalool; α-terpineol; aldehyde C-14; dioctyl adipate; 1,2 benzenedicarboxylic acid, di-C6-8, br alkyl ester (available commercially as JAYFLEX®77 from Exxon Chemical Americas, located in Houston, Tex.); 1,2 benzenedicarboxylic acid, di-C8-10, br alkyl ester (available commercially as JAYFLEX®DINP from Exxon Chemical Americas); pentaerythrityl tetracaprylate/tetracaprate (available commercially as CRODAMOL®PTC from Croda, Inc., located in Parsippany, N.J.); and pentaerythrityl tetraisostearate (available commercially as CRODAMOL®PTIS from Croda, Inc.). Some plasticizers may not be compatible with particular fragrance systems, which can cause hazing. 1,2 benzenedicarboxylic acid, di-C6-8, or alkyl ester (JAYFLEX®77) is a preferred plasticizer, because it exhibits compatibility with a wide variety of fragrance systems.

The choice of wicking material is also important in making an aesthetically acceptable transparent candle. Wicks containing a paper core have been observed to provide the most desired combination of burn characteristics, especially with respect to attributes such as smoke, bloom, fragrance throw and burn rate. Suitable wicks are commercially available from Atkins-Pearce of Covington, Ky.

The transparent candle compositions of the first embodiment may also contain a fragrance, for example, Citronella, AN114351 Sweet Peach, AN114349 Mountain Berry, AN114350 Country Garden, AN114462 Lavender Meadows, AN114463 Strawberries 'N Cream and AN114215 Vanilla from Noville Corp., South Hackensack, N.J. Such fragrances are typically added in an amount of about 0% to 5% by weight, and preferably in an amount of about 2.5%, with the level being selected so as to achieve the desired throwing power.

The transparent candle compositions of the first embodiment may also contain a coloring agent, which produces a desired color appearance. A composition having a coloring agent would preferably be transparent, much like a clear colored gemstone such as a ruby or emerald.

After a candle has been fabricated from a composition of the first embodiment, a clear coating may be added to the outside of the candle. When taken out of the mold, the candle may have a surface comparable in hardness to that of a wax candle that might be marred, for example by a fingerprint. Suitable coatings have a hard surface that is not easily marred, and preferably adhere well to the candle. Such a coating may be applied by dipping the candle in a material that dries to form a hard, adherent coating. Suitable coating materials may be selected from the group consisting of acrylic acid polymers and polyamide resins, such as VERSAMID® 1655. Depending on its thickness, the coating may reinforce the candle sides, although the composition of the candle should be hard enough that such reinforcement is not necessary. Depending on the thickness and material of the coating, a thin walled coating shell may be left as the candle burns.

A second embodiment of the present invention has a composition that includes a polyamide resin, a solubilizer, and an emulsifier, mixed together. The polyamide resin should be soluble in the solubilizer and the emulsifier at elevated temperatures, and at room temperature after cooling. The composition should be liquid at elevated temperatures but solid at room temperature.

The composition of the second embodiment includes on or more polyamide resins in a total amount of about 60–80% by weight of the composition, and more preferably about 70% by weight. This large proportion of polyamide resin imparts desirable characteristics to clear candles made of the compositions. For example, such candles have a hard outer surface that is mar resistant, even without a clear coating added to the outside of the candle. Such candles also tend to shrink away from the sides of a candle mold during cooling, such that a mold release is not needed to facilitate removal. The residue left by mold releases can therefore be avoided. Preferably, the polyamide resin is selected from the group consisting of (1) polyamides based on terpolymers of simple nylons (such as DuPont ELVAMIDE® 8061, which is a terpolymer of nylon 6, nylon 66, and nylon 610); and (2) polyamides based on complex fatty acids, such as the VERSAMID® series of Henkel Corp. or the UNIREZ® series of Union Camp Corp. U.S. Pat. No. 5,500,209, which is incorporated herein by reference, provides a more detailed description of these polyamides. More preferably, there is a single polyamide resin, VERSAMID® 1655.

The composition of the second embodiment includes one or more solubilizers in a total amount of about 10–25% by weight of the composition, and more preferably about 14% by weight. While not intending to be limited by any theory of how the present invention works, it is believed that, when present in amounts above about 10%, the solubilizer plasticizes the polyamide resin to the extent that a solvent is not needed to create a functional candle. In a candle without a significant amount of solvent, e.g., an amount of solvent below about 20%, or a candle where the solvent is not structurally bonded to the polyamide resin, structural integrity is provided by the polyamide resin alone. Such a candle has advantages over a candle where the structural integrity is provided by a structurally bonded matrix of gellant and solvent. For example, if the structural integrity of a candle depends on a matrix of gellant and solvent, one of these components may be preferentially burned from the pool during burning, resulting in an altered candle composition in the vicinity of the pool, particularly after multiple burnings. Such an altered composition may cause stress fracturing. This problem is avoided in a candle where the structural integrity is provided by polyamide resin alone. In addition, a composition having a large proportion of polyamide resin, plasticized by a solubilizer, is very resistant to thermal stress. As a result, candles made from such a composition can be subjected to accelerated cooling during manufacture without exhibiting external cracking or internal fractures. The term "accelerated cooling" as used herein refers to cooling at a rate substantially faster than cooling in room temperature air. For example, cooling in a cooling tunnel or a refrigerator are "accelerated" cooling. However, amounts of solubilizer above about 25% may lead to surface burning, where a flame spreads across the surface of a candle. The solubilizers are preferably selected from the group consisting of isostearic acid and branched chain fatty alcohols. More preferably, there is a single solubilizer, isostearyl alcohol.

The composition of the second embodiment includes one or more emulsifiers in a total amount of about 0.5%–7% by weight of the composition, and more preferably about 2.75% by weight. Candles having a high proportion of polyamide resin, such as the about 60%–80% of the second embodiment, typically exhibit excessive "tunneling." However, the presence of an emulsifier reduces or eliminates such tunneling. While not intending to be limited by any theory of how the present invention works, it is believed that this tunneling occurs because liquid from a pool having such a large amount of polyamide resin does not readily flow up the wick, which results in a flame that is not very hot, and that only melts a small pool. However, the emulsifier enables the liquid to readily flow up the wick during burning, such that a larger, hotter flame is sustained. As a result, a larger pool is melted, and tunneling is avoided. It is believed that the emulsifier modifies one or more properties of the liquid in the pool, such as its viscosity, surface tension, and/or the contact angle between the liquid and the wick. A high percentage of emulsifier is preferred for candles having a large diameter, because a larger pool is preferable in such candles. For example, a high percentage of emulsifier is preferable for a candle having a diameter of 5 inches or more. However, at concentrations above about 3%, the emulsifier may begin to decrease the clarity of the clear candle, and may cause the candle to become opaque at concentrations significantly above 7%. The emulsifiers are preferably selected from the group consisting of nonionic emulsifiers. More preferably, the emulsifiers are selected from the group consisting of sorbitan derivatives. Most preferably, there is a single emulsifier, sorbitan laureate. Alkanolamides are another preferred class of nonionic emulsifiers. Preferably, the alkanolamide is selected from the group consisting of lauric derivatives and coconut derivatives. More preferably, the alkanolamide is selected from the group consisting of lauric monoethanolamide, lauric diethanolamide, and lauric monopropanolamide. Also, the emulsifiers are preferably selected from the group consisting of non-ethoxylated emulsifiers.

The composition of the second embodiment may also include one or more solvents in a total weight of about 0–20% by weight of the composition. Preferably, the amount of solvent is about 0–10% by weight of the composition. The solvents may be esters of 12-hydroxystearic acid with a monohydric or polyhydric alcohol, such as octylhydroxystearate and derivatives thereof, or may be other solvents. Preferably, the structural integrity of the composition of the second embodiment relies solely on the polyamide resin, and not on a structurally bonded matrix formed between the polyamide resin and the solvent. This integrity can be achieved, for example, by not adding solvent in an amount significantly above 20%, or by manufacturing the composition in a way that does not encourage structural bonds between the solvent and the polyamide resin. For example, a process where the polyamide resin is melted in solvent alone should be avoided, such that the solvent does not have an opportunity to bond with the polyamide resin in the absence of other components, such as the solubilizer, that might interfere with or compete for such bonding.

The composition of the second embodiment may also include one or more additional ingredients, such as one or more fragrances or coloring agents. The amount and type of fragrance and/or coloring agent may be similar to that described for the composition of the first embodiment.

This invention will now be described in detail with respect to showing how certain specific representative embodiments thereof will be made, the materials, apparatus and process steps being understood as examples that are intended to be illustrative only. In particular, the invention is not intended to be limited to the methods, materials, conditions, process parameters, apparatus and the like specifically recited herein.

EXAMPLES OF THE INVENTION

Transparent candles representative of the first embodiment were prepared as follows:
(1) Octylhydroxystearate was added to a suitably sized container, which was agitated and heated to a temperature of 800° C.
(2) The gellant VERSAMIDS® 1655 was added, a little at a time, while the contents of the container were heated to 94–96° C. and agitated. Heating and agitation were continued until a phase change was observed, indicating that substantially all of the hydroxy groups on the octylhydroxystearate had bound to the gellant.
(3) The composition was poured into a mold, and a wick was added while the composition was liquid. The composition was allowed to cool to room temperature and solidify.

The amount of gellant was varied between about 10% and 100%, with the amount of octylhydroxystearate correspondingly being varied between about 90% and 0%. For amounts of gellant above about 70%, tunneling was observed in the resultant candles. For amounts of gellant below about 40%, hazing, cracking, and syneresis were observed in the resultant candles. While the candles were transparent and functional, there was some small degree of haziness in all of the candles made of a composition of only octylhydroxystearate and VERSAMID® 1655.

Further transparent candles representative of the first embodiment were prepared as follows:
(1) The solvent was added to a suitably sized container, which was agitated and heated to a temperature of 80° C.
(2) The gellant was added, a little at a time, while the contents of the container were heated to 94–96° C. and agitated. No other components were added until a phase change was observed, indicating that the gellant had bound completely with the hydroxy group on the solvent.
(3) The other components were added, one at a time, stirring between each component. The components were added in an order determined by the amount of the component, from largest to smallest. Fragrance was added last. While a coloring agent was not used in the examples, any coloring agent would have been added after the other components. While this largest to smallest order, with the fragrance and coloring agent last, is preferred, the components other than the solvent and gellant may be added in any order.
(4) The composition was poured into a mold, and a wick was added while the composition was liquid. The composition was allowed to cool to room temperature and solidify.

While not intending to be limited by any theory of how the first embodiment works, it is believed that hydroxy groups on the solvent bind to the gellant, and that the best clarity is achieved when substantially all of the hydroxy groups on the solvent bind to the gellant. Because the solubilizer and other components may also have hydroxy groups that may bind to available sites on the gellant, it is believed that such components should not be added until after the gellant and solvent have been mixed for a time sufficient to allow substantially all of the hydroxy groups on the solvent to bind to the gellant, such that hydroxy groups on such components do not compete with the hydroxy groups on the solvent for binding sites on the gellant.

Using the above-noted procedure, compositions representative of the first embodiment, as listed in Table 1, were prepared:

TABLE 1

| Composition | 1 | 2 | 3 | 4 | 5 | 6 | 7 | 8 | 9 |
|---|---|---|---|---|---|---|---|---|---|
| Solvent | 37.5 | 39.5 | 31.0 | 48.0 | 17.0 | 31.0 | 36.0 | 41.0 | 24.0 |
| Gellant | 50.0 | 50.0 | 55.0 | 45.0 | 60.0 | 55.0 | 50.0 | 50.0 | 67.0 |
| Isostearyl alcohol | 8.0 | 8.0 | 10.0 | 5.0 | 10.0 | 5.0 | 5.0 | 4.0 | 3.0 |
| Fragrance | 2.5 | 2.5 | 3.0 | 2.0 | 3.0 | 3.0 | 3.0 | 3.0 | 5.0 |
| Isostearic acid | 0.0 | 0.0 | 1.0 | 0.0 | 10.0 | 5.0 | 5.0 | 0.0 | 0.0 |
| Plasticizer | 1.0 | 0.0 | 0.0 | 0.0 | 0.0 | 1.0 | 1.0 | 2.0 | 1.0 |
| Emulsifier | 1.0 | 0.0 | 0.0 | 0.0 | 0.0 | 0.0 | 0.0 | 0.0 | 0.0 |

For each of the compositions of Table 1, the solvent was octylhydroxystearate and the gellant was VERSAMID® 1655. Isostearyl alcohol and isostearic acid were both used as solubilizers, either individually or in a mixture. The plasticizer was 1,2 benzene dicarboxylic acid, di-C-6-8, br alkyl ester (JAYFLEX®77) in composition 1, and stearic acid in compositions 6–9. The emulsifier was sorbitan laureate (SPAN®20) in composition 1.

Candles made from each of the compositions of Table 1 were transparent and functional, although some of the compositions did not have as high a degree of clarity as others. Composition 1 is the preferred composition, because it shows the most desirable combination of properties, including a very high degree of clarity, and no cracking, syneresis, or darkening during burning.

Transparent candles representative of the second embodiment were prepared as follows:

(1) The solubilizer and solvent were added to a suitably sized container.

(2) The polyamide resin was added to the container (3) The contents of the container were heated to about 110° C. and stirred until the polyamide resin melted.

(3) The temperature was lowered to about 100–105° C. With the temperature at about 100–105° C., the emulsifier was added, with stirring.

(4) With the temperature at about 100–105° C., the fragrance and dye were added, with stirring.

(5) The composition was poured into a mold, and a wick was added while the composition was liquid. The composition was allowed to cool to room temperature and solidify. Some of the compositions were allowed to "set," and then placed in a freezer for accelerated cooling. The term "set" as used herein refers to allowing a liquid composition to begin to solidify, typically near the surface of the mold. Significant liquid may still be present after the composition has set. Even with accelerated cooling, the compositions did not crack or fracture internally.

While not intending to be limited by any theory of how the second embodiment works, it is believed that keeping the amount of solvent below about 20%, and/or adding the solubilizer before the polyamide resin melts in any solvent that might be present, leads to a composition where the structural integrity is provided by the polyamide resin alone. Such a composition is hard and mar resistant, yet able to withstand thermal stress without fracturing or cracking, due to the presence of the solubilizer.

Using the above-noted procedure, compositions representative of the second embodiment, as listed in Table 2, were prepared:

TABLE 2

| Composition | 1 | 2 | 3 | 4 | 5 | 6 | 7 | 8 |
|---|---|---|---|---|---|---|---|---|
| Polyamide Resin | 74.1 | 73.2 | 70.6 | 70.0 | 67.0 | 68.0 | 70.0 | 70.0 |
| Solvent | 0.0 | 0.0 | 0.0 | 10.0 | 10.0 | 10.0 | 10.5 | 10.25 |
| Solubilizer | 24.7 | 24.4 | 24.0 | 14.0 | 14.0 | 14.0 | 14.0 | 14.0 |
| Emulsifier | 1.2 | 2.4 | 2.4 | 3.0 | 6.0 | 5.0 | 2.5 | 2.75 |
| Fragrance | 0.0 | 0.0 | 3.0 | 3.0 | 3.0 | 3.0 | 3.0 | 3.0 |

The polyamide resin was VERSAMID® 1655 in all compositions of Table 2. The solvent was octyl hydroxystearate in all compositions having a solvent. The solubilizer was isostearyl alcohol in all compositions except composition 1, where isostearic acid was used as the solubilizer. The emulsifier was sorbitan laureate in all compositions.

Candles made from each of the compositions of Table 2 were transparent and functional, although some of the compositions did not have as high a degree of clarity as others. Composition 3 exhibited a small tendency toward surface flaming as discussed below. Composition 8 is a preferred composition, because it exhibited most desirable combination of properties, including a very high degree of clarity and no cracking, syneresis, or darkening during burning. Composition 4 also exhibited a very desirable combination of properties, and is also a preferred composition.

While not intending to be limited by any theory of how the present invention works, it is believed that one cause of surface flaming is a high primary alcohol content in the composition. The use of isostearyl alcohol as a preferred solubilizer is usually the largest contributor to this primary alcohol content. However, other components, such as fragrances, may also contain primary alcohols and contribute a small amount to the total primary alcohol content. For example, composition 3 is basically composition 2 with 3% fragrance added, and 0.4% isostearyl alcohol and 2.6% polyamide resin removed. This change may have resulted in a net increase to the primary alcohol content that caused composition 3 to exhibit a small tendency toward surface flaming, while composition 2 did not. Moreover, it is preferable to have a primary alcohol content substantially below that at which surface flaming occurs, which is why the amount of isostearyl alcohol was reduced to 14% for compositions 4 through 8. However, reducing the percentage of isostearyl alcohol means that the percentage of other components must be increased. Increasing the percentage of polyamide resin would not be expected to cause surface flaming, but increasing the percentage of polyamide resin too much might reduce the plasticity of the polyamide resin and lead to undesirable characteristics such as tunneling. However, one or more other components that do not contain primary alcohols may be used to offset the reduction in the percentage of isostearyl alcohol, while keeping the ratio of polyamide resin to solubilizer well within the range within which the desired plasticity is exhibited. For example, in compositions 4 through 8, the reduction in the percentage of isostearyl alcohol was offset more or less by the addition of octyl hydroxystearate, a solvent that has an alcohol group, but is not a primary alcohol. Keeping the amount of solvent below about 20%, and adding the solubilizer before the polyamide resin is allowed to bond with the solvent, appears to result in a composition where the structural integrity is provided by the polyamide resin alone, and not having a structurally bonded matrix of polyamide resin and solvent. A solubilizer that is not a primary alcohol, such as isostearic acid, could also be used to offset the reduction in the percentage of isostearyl alcohol.

Several embodiments of the present invention are specifically illustrated and/or described herein. However, it will be appreciated that modifications and variations of the those embodiments are encompassed by the above teachings as well as the attached claims.

What is claimed is:

1. A composition for use in a clear solid candle, comprising:
    one or more polyamide resins, wherein the total weight of the polyamide resins is about 60–80% by weight of the composition;
    one or more solubilizers; and
    one or more emulsifiers.

2. The composition of claim 1, wherein the total weight of the polyamide resins is about 70% by weight of the composition.

3. The composition of claim 1, wherein the polyamide resins are selected from the group consisting of: (1) polyamides based on terpolymers of nylon 6, nylon 66, and nylon 610; and (2) polyamides based on fatty acids.

4. The composition of claim 1, wherein the total weight of the solubilizers is about 10–25% by weight of the composition.

5. The composition of claim 4, wherein the solubilizers comprise isostearic acid and/or branched chain fatty alcohols.

6. The composition of claim 5, wherein one of the solubilizers is isostearyl alcohol.

7. The composition of claim 1, wherein the total weight of the emulsifiers is about 0.5–7% by weight of the composition.

8. The composition of claim 7, wherein the emulsifiers comprise nonionic emulsifiers.

9. The composition of claim 7, wherein the emulsifiers comprise non-ethoxylated emulsifiers.

10. The composition of claim 8, wherein at least one of the emulsifiers comprise a sorbitan derivative.

11. The composition of claim 10, wherein one of the emulsifiers is sorbitan laureate.

12. The composition of claim 8, wherein at least one of the emulsifiers comprises an alkanolamide.

13. The composition of claim 12, wherein at least one of the emulsifiers comprises lauric derivatives and/or coconut derivatives.

14. The composition of claim 13, wherein at least one of the emulsifiers is selected from the group consisting of lauric monoethanolamide, lauric diethanolamide, and lauric monopropanolamide.

15. The composition of claim 1, further comprising one or more solvents, wherein the total weight of the solvents is about 0–20% be weight of the composition.

16. The composition of claim 15, wherein one of the solvents is octylhydroxystearate.

17. The composition of claim 1, further comprising one or more fragrances in a total amount of about 0–5% by weight of the composition.

18. A composition for use in a clear solid candle, comprising:
    about 60–80% by weight polyamide resin;
    about 10–25% by weight isostearyl alcohol;
    about 0–20% by weight octylhydroxystearate;
    about 1–7% by weight sorbitan laureate;
    about 0–5% by weight fragrance.

19. The composition of claim 18, comprising:
    about 70% by weight polyamide resin;
    about 14% by weight isostearyl alcohol;
    about 10% by weight octylhydroxystearate;
    about 2.5% by weight sorbitan laureate;
    about 3% by weight fragrance.

20. A clear solid candle, comprising:
    (a) a composition that serves as the base material for the candle, the composition further comprising:
        (1) one or more gellants, wherein the total weight of the gellants is about 60–80% by weight of the composition;
        (2) one or more solubilizers; and
        (3) one or more emulsifiers; and
    (b) a wick embedded in the composition, with a portion of the wick extending out of a top surface of the composition.

21. A method of making a clear composition for use in a clear solid candle, comprising the steps of:
    adding one or more solubilizers and one or more solvents to a container;
    adding one or more polyamide resins to the container, wherein the total weight of the polyamide resins is about 60–80% by weight of the composition;
    heating the one or more solubilizers, one or more solvents, and one or more polyamide resins and stirring until the one or more polyamide resins melt; and
    adding one or more emulsifiers to the container after the one or more polyamide resins have melted, and stirring.

22. The method of claim 21, wherein the temperature reached during the step of heating is about 110° C.

23. The method of claim 22, further comprising the step of cooling the one or more solubilizers, one or more solvents, and one or more polyamide resins to about 100–105° C. after the step of heating and before the step of adding one or more emulsifiers.

24. A method of making a clear solid candle, comprising the steps of:
    making a clear composition according to the method of claim 21;
    pouring the clear composition into a mold;
    adding a wick;
    allowing the composition to set in the mold;
    subjecting the composition to accelerated cooling.

* * * * *